(12) United States Patent
Wilson et al.

(10) Patent No.: US 10,670,349 B2
(45) Date of Patent: Jun. 2, 2020

(54) ADDITIVELY MANUFACTURED HEAT EXCHANGER

(71) Applicant: General Electric Company, Schenectady, NY (US)

(72) Inventors: Nicholas Allan Wilson, Cincinnati, OH (US); Jeffrey Douglas Rambo, Mason, OH (US); Donald Michael Corsmeier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/652,717

(22) Filed: Jul. 18, 2017

(65) Prior Publication Data
US 2019/0024989 A1    Jan. 24, 2019

(51) Int. Cl.
  *F28F 9/02*      (2006.01)
  *F28D 1/047*     (2006.01)
  (Continued)

(52) U.S. Cl.
  CPC ......... *F28F 9/0273* (2013.01); *F02C 7/141* (2013.01); *F28D 1/0477* (2013.01); *F28F 9/027* (2013.01); *F28F 9/0214* (2013.01); *F28F 9/0243* (2013.01); *F05D 2260/213* (2013.01); *F28D 2021/0026* (2013.01);
  (Continued)

(58) Field of Classification Search
  CPC ...... F28F 9/0243; F28F 9/0273; F28F 9/0214; F28F 2009/0297; F28F 9/027; F28F 2009/0285; F28F 2210/02; F28D 1/0477; F28D 2021/0026; F02C 7/141; F05D 2260/213
  See application file for complete search history.

(56) References Cited

U.S. PATENT DOCUMENTS 3,112,793 A   12/1963  Sass
3,262,497 A *  7/1966  Worthen ................. F22B 1/123
                                                        165/176

(Continued)

FOREIGN PATENT DOCUMENTS

EP           0802383 A2    10/1997
WO      WO2013/163398 A1   10/2013

OTHER PUBLICATIONS

Maloney, et al., Multifunctional heat exchangers derived from three-dimensional micro-lattice structures, International Journal of Heat and Mass Transfer, https://doi.org/10.1016/j.ijheatmasstransfer.2012.01.011. vol. 55, Issues 9-10, Apr. 2012, pp. 2486-2493. (Article Abstract only).

*Primary Examiner* — Gordon A Jones
(74) *Attorney, Agent, or Firm* — Dority & Manning, P.A.

(57) ABSTRACT

A heat exchanger includes a heat exchanger core, a header defining a header manifold, and a transition portion that provides fluid communication between the heat exchanger core and the header manifold. The transition portion includes a transition tube extending between the header and the heat exchanger core, a header junction where the transition tube joins the header, and a splitting junction that splits the transition tube into the plurality of heat exchange tubes. The header junction may define elliptical inlet apertures, a large filleted joint, and a junction thickness that is greater than a header wall thickness.

15 Claims, 10 Drawing Sheets

(51) Int. Cl.
   *F02C 7/141* (2006.01)
   *F28D 21/00* (2006.01)
(52) U.S. Cl.
   CPC ............... *F28F 2009/0285* (2013.01); *F28F 2009/0297* (2013.01); *F28F 2210/02* (2013.01)

(56) References Cited

U.S. PATENT DOCUMENTS

| | | | |
|---|---|---|---|
| 3,774,678 A * | 11/1973 | Glorisi | B60K 11/02 137/510 |
| 4,577,684 A | 3/1986 | Hagemeister | |
| 4,976,310 A | 12/1990 | Jabs | |
| 5,033,542 A * | 7/1991 | Jabs | F28D 7/06 122/510 |
| 5,086,996 A | 2/1992 | Roeder et al. | |
| 5,544,700 A | 8/1996 | Shagoury | |
| 5,642,778 A | 7/1997 | Gentry | |
| 6,186,225 B1 | 2/2001 | Higgins | |
| 6,516,873 B1 | 2/2003 | Haugen | |
| 6,918,598 B2 | 7/2005 | Wilcox et al. | |
| 7,774,937 B2 | 8/2010 | Agee | |
| 7,784,528 B2 | 8/2010 | Ottow et al. | |
| 7,866,372 B2 | 1/2011 | Slaughter | |
| 8,079,407 B2 | 12/2011 | Fellague et al. | |
| 8,661,783 B2 | 3/2014 | Foster | |
| 8,794,299 B2 | 8/2014 | Barfknecht et al. | |
| 9,200,855 B2 | 12/2015 | Kington et al. | |
| 9,394,828 B2 | 7/2016 | Elftheriou et al. | |
| 9,453,604 B1 * | 9/2016 | Maloney | F16L 41/00 |
| 10,041,740 B2 * | 8/2018 | Takase | F28F 9/26 |
| 2007/0062679 A1 * | 3/2007 | Agee | F28F 9/02 165/158 |
| 2009/0173072 A1 * | 7/2009 | Mastronarde | F28D 7/1623 60/659 |
| 2013/0236299 A1 * | 9/2013 | Kington | F02C 7/10 415/177 |
| 2013/0255926 A1 * | 10/2013 | Hirayama | F28F 1/00 165/173 |
| 2014/0251585 A1 | 9/2014 | Kusuda et al. | |
| 2015/0345298 A1 | 12/2015 | Mongillo et al. | |
| 2015/0377135 A1 * | 12/2015 | Kupiszewski | F02C 3/04 60/806 |
| 2016/0201989 A1 | 7/2016 | Martinez et al. | |
| 2016/0202003 A1 | 7/2016 | Gerstler et al. | |
| 2016/0333790 A1 | 11/2016 | Kironn et al. | |
| 2017/0044982 A1 | 2/2017 | Duesler et al. | |
| 2017/0045309 A1 * | 2/2017 | Schwalm | F28F 9/0243 |
| 2017/0082372 A1 | 3/2017 | Vos et al. | |
| 2017/0089643 A1 | 3/2017 | Arafat | |
| 2017/0115065 A1 | 4/2017 | Rhoden et al. | |
| 2017/0131034 A1 | 5/2017 | Ribarov et al. | |

\* cited by examiner

ADDITIVELY MANUFACTURED HEAT EXCHANGER

FIELD

The present subject matter relates generally to a heat exchanger, or more particularly to additively manufactured heat exchangers used in a gas turbine engine.

BACKGROUND

Heat exchangers may be employed in conjunction with gas turbine engines for transferring heat between one or more fluids. For example, a first fluid at a relatively high temperature may be passed through a first passageway, while a second fluid at a relatively low temperature may be passed through a second passageway. The first and second passageways may be in thermal contact or close proximity, allowing heat from the first fluid to be passed to the second fluid. Thus, the temperature of the first fluid may be decreased and the temperature of the second fluid may be increased.

Conventional heat exchangers include a large number of fluid passageways, each fluid passageway being formed using some combination of plates, bars, foils, fins, manifolds, support structures, mounting flanges, etc. Each of these parts must be individually positioned, oriented, and connected to the supporting structure, e.g., via brazing, welding, or another joining method. The manufacturing time and costs associated with the assembly of such a heat exchanger are very high and the likelihood of fluid leaks between the fluid passageways or from the heat exchanger in general is increased due to the number of joints formed.

In addition, manufacturing restrictions may limit the number, size, and configuration of heat exchanger tubes that can fit within a restricted space. For example, conventional heat exchangers may include a supply header and a return header for circulating a heat exchange fluid within a plurality of heat exchange tubes. The size of the supply and return headers may be limited due to space restrictions, and the number of heat exchange tubes that can be coupled to those headers can also be limited, e.g., due to manufacturing limitations related to forming the joint between the heat exchange tubes and the headers.

Accordingly, a gas turbine engine with an improved heat exchanger would be useful. More specifically, a heat exchanger for a gas turbine engine that is easier to manufacture and includes features for improved thermal performance and reliability would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a heat exchanger defining a vertical direction, a lateral direction, and a transverse direction is provided. The heat exchanger includes a heat exchanger core including a plurality of heat exchange tubes and a header extending along the transverse direction and defining a header manifold, the header defining a header wall thickness. A transition portion provides fluid communication between the heat exchanger core and the header manifold. The transition portion includes a transition tube extending between the header and the heat exchanger core and a header junction where the transition tube joins the header, the header junction defining a junction thickness that is greater than the header wall thickness.

In another exemplary embodiment of the present disclosure, a method for manufacturing a heat exchanger defining a vertical direction, a lateral direction, and a transverse direction is provided. The method includes depositing a layer of additive material on a bed of an additive manufacturing machine and selectively directing energy from an energy source onto the layer of additive material to fuse a portion of the additive material and form the heat exchanger. The heat exchanger includes a heat exchanger core including a plurality of heat exchange tubes and a header extending along the transverse direction and defining a header manifold, the header defining a header wall thickness. A transition portion provides fluid communication between the heat exchanger core and the header manifold. The transition portion includes a transition tube extending between the header and the heat exchanger core and a header junction where the transition tube joins the header, the header junction defining a junction thickness that is greater than the header wall thickness.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
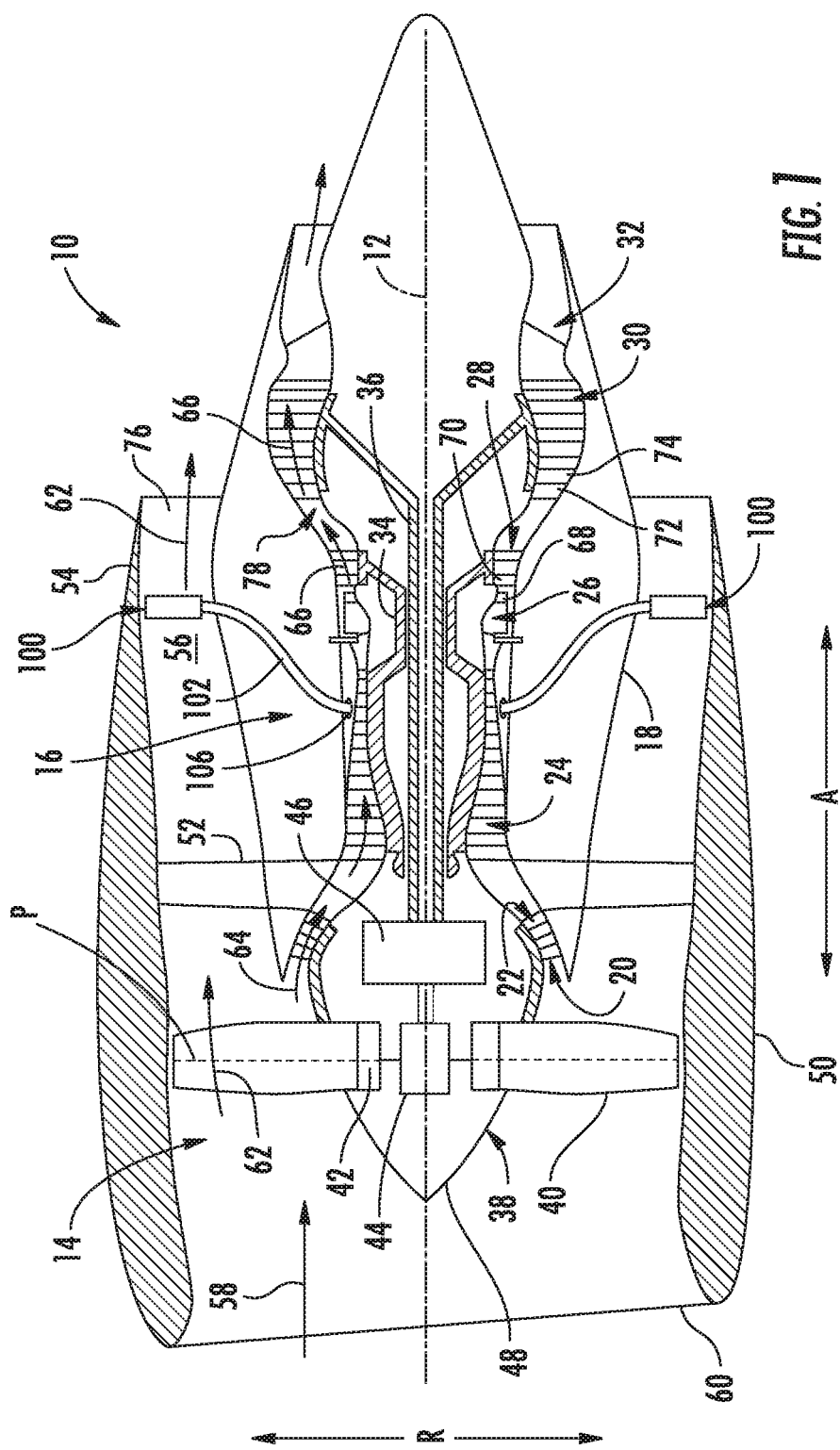
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

The present disclosure is generally directed to a heat exchanger for a gas turbine engine. The heat exchanger includes a heat exchanger core, a header defining a header manifold, and a transition portion that provides fluid communication between the heat exchanger core and the header manifold. The transition portion includes a transition tube extending between the header and the heat exchanger core, a header junction where the transition tube joins the header, and a splitting junction that splits the transition tube into the plurality of heat exchange tubes. The header junction may define elliptical inlet apertures, a large filleted joint, and a junction thickness that is greater than a header wall thickness.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference), a radial direction R, and a circumferential direction C extending about the axial direction A (see e.g., FIG. 2). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only and that in other exemplary embodiments, turbofan 10 may have any other suitable configuration. For example, it should be appreciated that in other exemplary embodiments, turbofan 10 may instead be configured as any other suitable turbine engine, such as a turboprop engine, turbojet engine, internal combustion engine, etc.

Figure 2:
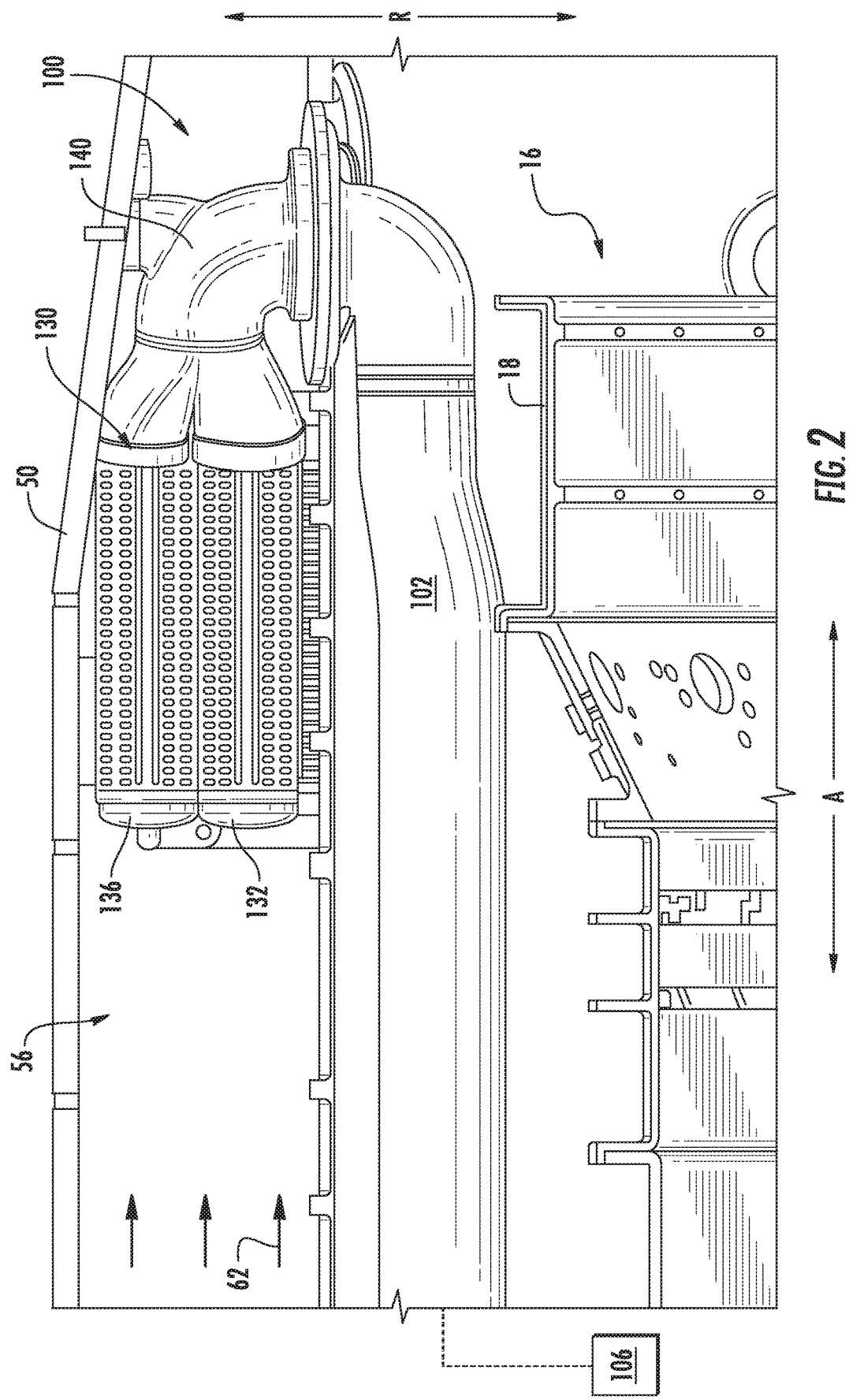
FIG. 2 is a schematic side view of an exemplary heat exchanger assembly that may be used in the exemplary gas turbine engine of FIG. 1 in accordance with an exemplary embodiment of the present disclosure, with a heat exchanger core removed for clarity.
Figure 3:
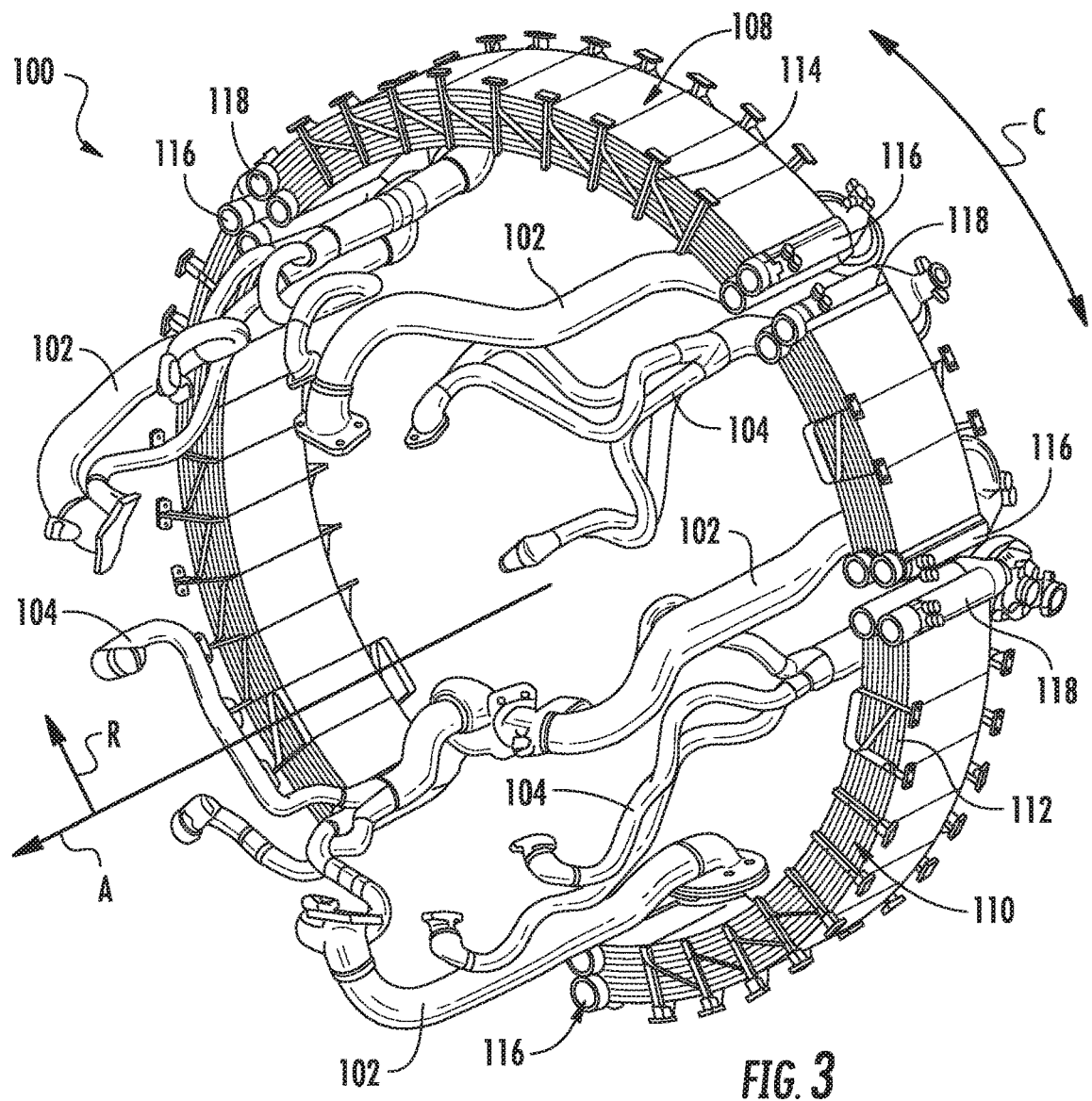
FIG. 3 is a perspective view the exemplary heat exchanger assembly of FIG. 2 according to an exemplary embodiment of the present subject matter.

Referring now generally to FIGS. 1 through 4, a heat exchanger assembly 100 will be described according to an exemplary embodiment of the present subject matter. Heat exchanger assembly 100 may be used to transfer heat between two or more fluids in any suitable application. For example, as illustrated in FIGS. 1 through 3, heat exchanger assembly 100 is positioned within bypass airflow passage 56 and includes a plurality of fluid supply lines 102 and return lines 104 that are coupled to a heated fluid supply, such as a compressor bleed port 106. In this manner, for example, hot, compressed air may be bled off of HP compressor 24 and passed through heat exchanger assembly 100 where it is cooled by first portion of air 62 flowing through bypass airflow passage 56. The cooled air may then be recirculated into core engine 16 through return lines 104 or used for any other suitable purpose.

As illustrated herein, heat exchanger assembly 100 is an air cooling air heat exchanger configured for transferring heat between a hot stream and a cool stream of air within a gas turbine engine. However, it should be appreciated that heat exchanger assembly 100 can be configured for receiving any suitable number and type of fluids for use in the heat transfer process, examples of which are described herein. In addition, the concepts and heat exchanging structures disclosed herein could be similarly used in automotive, aviation, maritime, and other industries to assist in heat transfer between fluids. Moreover, FIG. 1 illustrates an exemplary embodiment of heat exchanger assembly 100 for the purpose of explaining its general operation, but the size, shape, and configuration of heat exchanger assembly 100 is not intended to limit the scope of the present subject matter. For example, the size, shape, number, and configuration of fluid passageways may be varied while remaining within the scope of the present subject matter.

In general, the exemplary embodiments of heat exchanger assembly 100 described herein may be manufactured or formed using any suitable process. However, in accordance with several aspects of the present subject matter, heat exchanger assembly 100 may be formed using an additive-manufacturing process, such as a 3-D printing process. The use of such a process may allow heat exchanger assembly 100 to be formed integrally, as a single monolithic component, or as any suitable number of sub-components. In particular, the manufacturing process may allow heat exchanger assembly 100 to be integrally formed and include a variety of features not possible when using prior manufacturing methods. For example, the additive manufacturing methods described herein enable the manufacture of heat exchangers having unique features, configurations, thicknesses, materials, densities, fluid passageways, headers, and mounting structures not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways and manifolds with integral mounting features. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved functionality and reliability.

Figure 4:
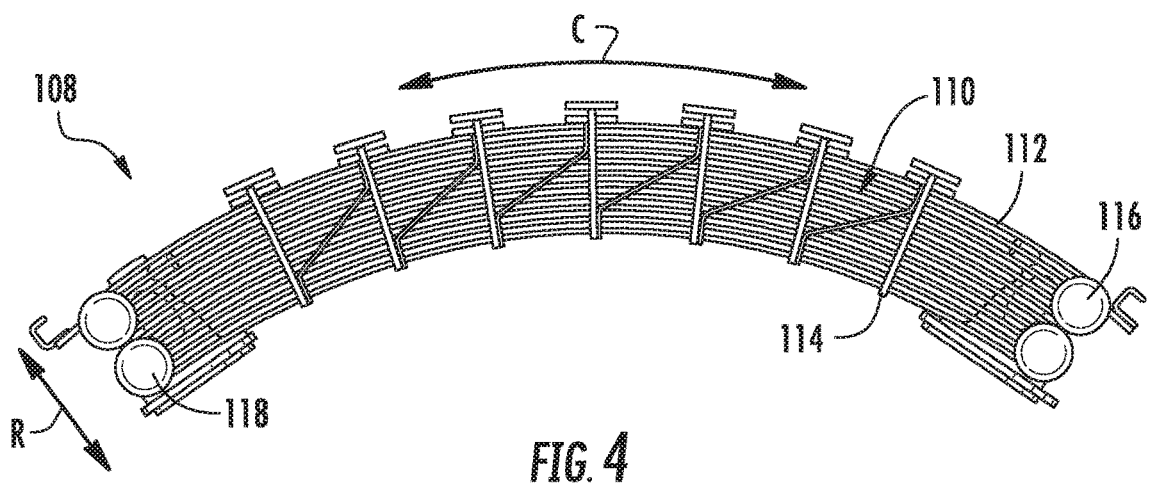
FIG. 4 is a front view of a heat exchanger segment of the exemplary heat exchanger assembly of FIG. 2 according to an exemplary embodiment of the present subject matter.

Referring now specifically to FIGS. 3 and 4, heat exchanger assembly 100 will be described in more detail according to an exemplary embodiment of the present subject matter. Heat exchanger assembly 100 generally includes a plurality of heat exchanger segments, referred to herein simply as heat exchangers 108 that extend along the circumferential direction C around core engine 16. As illustrated, heat exchanger assembly 100 includes four heat exchangers 108 that extend around substantially an entire circumference of core engine 16. However, according to alternative embodiments, any suitable number and size of heat exchanger 108 may be used depending on the application.

Heat exchanger assembly 100 generally defines an axial direction A, a radial direction R, and a circumferential direction C which correspond to the similar directions of turbofan engine 10 when heat exchanger assembly 100 is installed therein. For clarity, not all portions of heat exchanger assembly 100 are illustrated in each of the figures, and modifications and variations may be made to heat exchanger assembly 100 while remaining within the scope of the present subject matter.

Each heat exchanger 108 is placed in fluid communication with one or more supply lines 102 and one or more return lines 104 for circulating a heat exchange fluid through the heat exchanger 108. As explained briefly above, according to an exemplary embodiment supply lines 102 may be fluidly coupled to a heated fluid supply for supplying a flow of heat exchange fluid, e.g., such as to HP compressor 24 via bleed port 106 (see, e.g., FIG. 1) for supplying a flow of hot, compressed air. The flow of heat exchange fluid passes through heat exchanger 108 where it is cooled before being discharged via return lines 104.

Each heat exchanger 108 generally includes a heat exchanger core 110 including a plurality of heat exchange tubes 112. According to the illustrated embodiment, heat exchanger 108 also includes a plurality of support brackets 114 for supporting heat exchange tubes 112. Heat exchange tubes 112 may be sized, positioned, and oriented in any suitable manner within heat exchanger core 110. For example, according to the embodiment illustrated in FIGS. 3 and 4, heat exchange tubes 112 are arcuate and extend along the circumferential direction C. In addition, heat exchange tubes 112 are spaced apart to define arcuate passageways through which a second flow of heat exchange fluid may flow, e.g., such as first portion of air 62 within bypass passageway 56.

Figure 8:
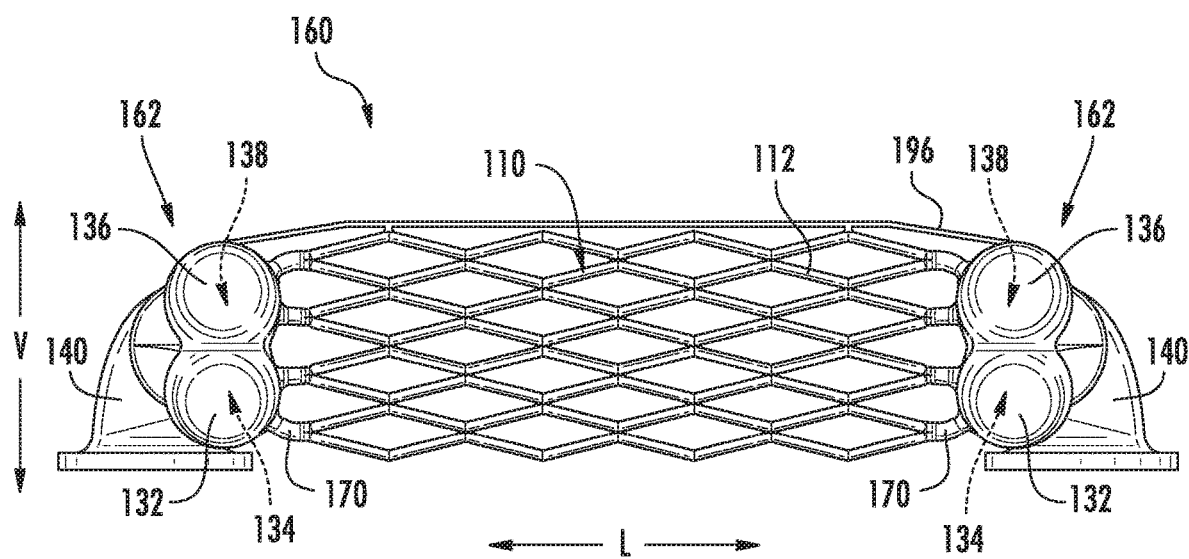
FIG. 8 is a front view of an exemplary heat exchanger assembly that may be used in the exemplary gas turbine engine of FIG. 1 in accordance with another exemplary embodiment of the present disclosure.
Figure 9:
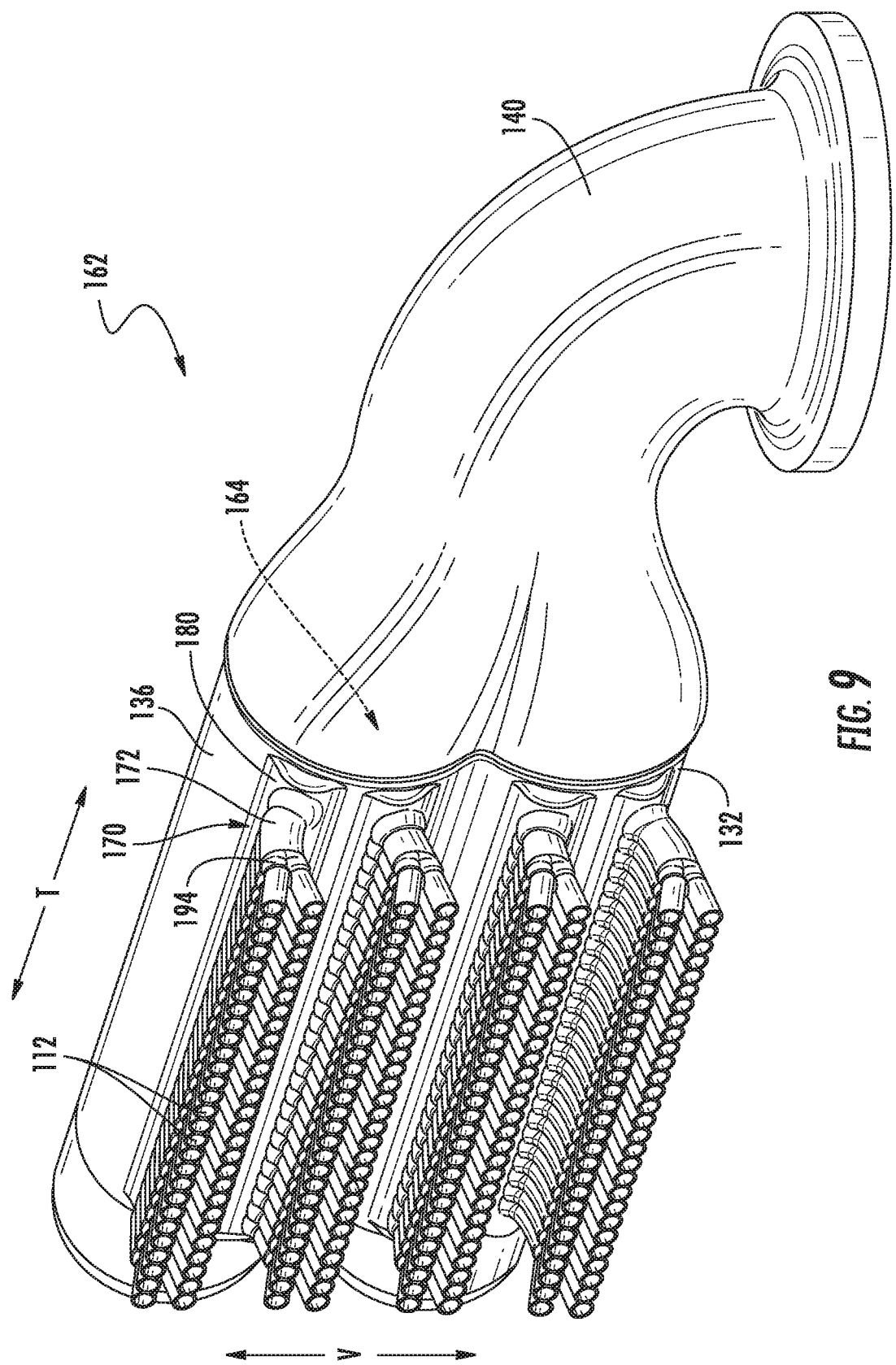
FIG. 9 is perspective view of a header assembly of the exemplary heat exchanger assembly of FIG. 8 according to an exemplary embodiment of the present subject matter, with a portion of the heat exchanger core removed for clarity.

By contrast, according to the embodiment illustrated in FIGS. 8 and 9, heat exchanger core 110 can include heat exchange tubes 112 that are formed into a lattice structure. More specifically, heat exchange tubes 112 can zig-zag along the circumferential direction C, e.g., may move inward and outward along the radial direction R to form a plurality of joints with adjacent rows of heat exchange tubes 112. By forming junctions between adjacent rows in this manner, a lightweight, but stiff lattice structure is provided which can eliminate the need for structural supports. In addition, the zig-zag structure and joints can maintain a turbulent flow of heat exchange fluid for improved thermal efficiency of heat exchanger 108.

Referring again to FIGS. 3 and 4, heat exchanger assembly 100 includes one or more header assemblies for providing fluid communication between the heat exchanger core 110 and the supply and return lines 102, 104. More specifically, for each heat exchanger 108, a supply header 116 provides fluid communication between supply lines 102 and an upstream end of each of the heat exchange tubes 112 while a return header 118 provides fluid communication between a downstream end of each of the heat exchange tubes 112 and return lines 104. In this manner, heat exchange fluid, e.g., compressed air bled off HP compressor 24, may be passed through heat exchanger core 110 to facilitate the heat transfer process.

Figure 5:
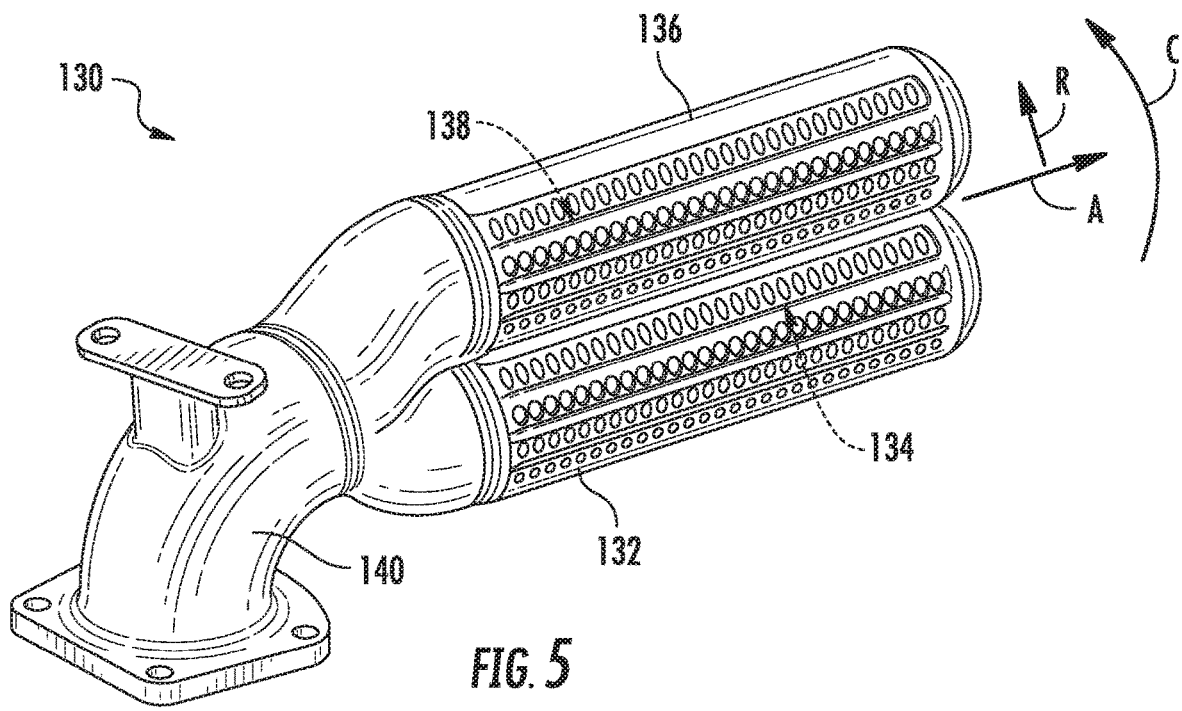
FIG. 5 is a perspective view of a header assembly of the exemplary heat exchanger assembly of FIG. 2 according to an exemplary embodiment of the present subject matter, with the heat exchanger core removed for clarity.
Figure 6:
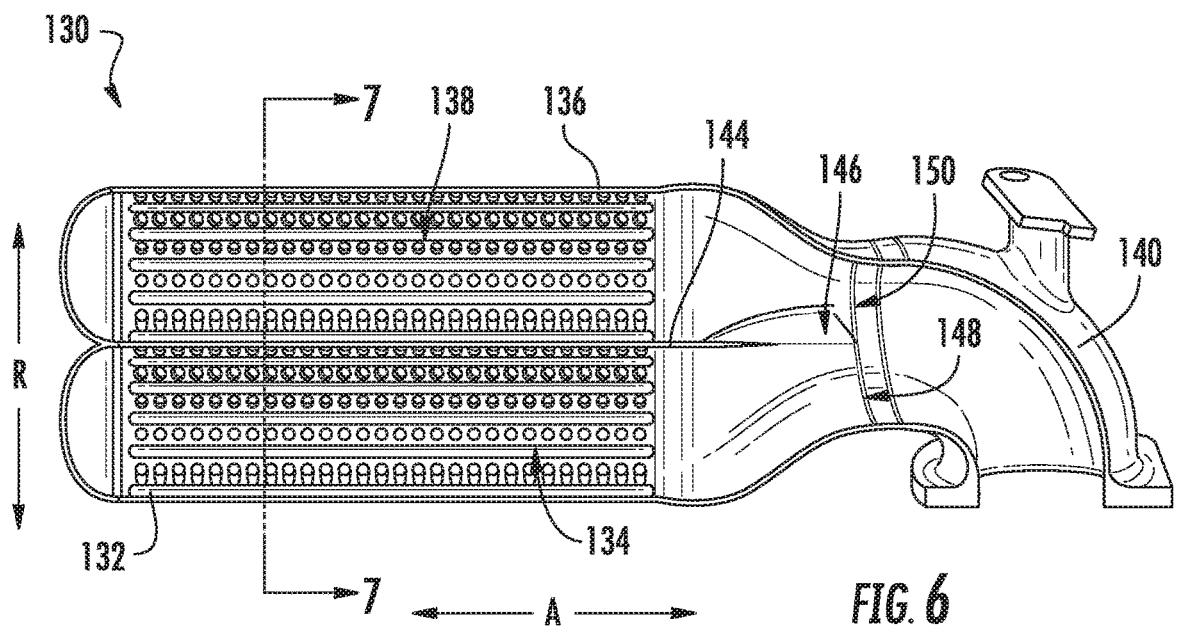
FIG. 6 is a side, cross sectional view of the exemplary header assembly of FIG. 5.
Figure 7:
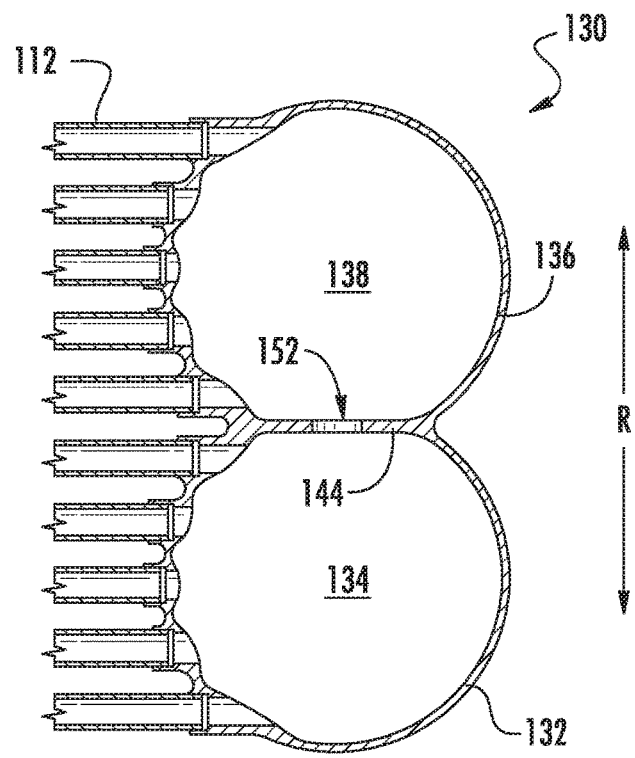
FIG. 7 is a cross-sectional view of the exemplary header assembly of FIG. 5, taken along Line 7-7 of FIG. 6.

Referring now generally to FIGS. 5 through 7, a header or header assembly 130 will be described according to an exemplary embodiment of the present subject matter. In general, header assembly 130 may be used to distribute a heat exchange fluid to a plurality of heat exchange tubes in any suitable application. For example, as described herein, header assembly 130 may be supply header 116 or return header 118 for circulating heat exchange fluid within heat exchange tubes 112 of heat exchanger core 110. Although described below in this context, it should be appreciated the header assembly 130 may be used in any other suitable heat exchanger or application.

As illustrated, header assembly 130 includes a first barrel 132 that extends along the axial direction A and defines a first manifold 134 in fluid communication with a first plurality of heat exchange tubes 112. In addition, header assembly includes a second barrel 136 that extends along the axial direction A and defines a second manifold 138 in fluid communication with a second plurality of heat exchange tubes 112. In addition, header assembly 130 includes an inlet manifold 140 in fluid communication with first manifold 134 and second manifold 138, e.g., to provide fluid communication between supply line 102 and manifolds 134, 138. The flow of heat exchange fluid may be distributed throughout manifolds 134, 138 and to heat exchange tubes 112. Downstream of heat exchanger core 110, a return header 118 may be configured in the same manner as header assembly 130 for returning the flow of heat exchange fluid via return line 104.

In general heat exchanger core 110 and header assemblies 130 may be sized, positioned, and oriented in any suitable manner for achieving the desired thermal performance while fitting within the restricted space available within bypass airflow passage 56. According to the illustrated embodiment, heat exchange tubes 112 are stacked in a plurality of rows along the radial direction R and a plurality of columns along the axial direction A to maximize the tube surface area for heat transfer. In addition, each of the plurality of rows of heat exchange tubes 112 extends from first barrel 132 or second barrel 136 substantially along the circumferential direction C. In this manner, heat exchanger core 110 can be curved to correspond to the shape of the bypass airflow passage 56 such that the heat exchange process can be improved.

According to the illustrated embodiment, first barrel 132 and second barrel 136 each have a substantially circular cross section. A circular cross section may be desirable, for example, to withstand the stresses experienced within header assembly 130 due to the high pressure bleed air from HP compressor 24. Because the circular cross section is structurally efficient, less material may be used to form barrels 132, 136, resulting in a lighter weight heat exchanger assembly 100.

Notably, conventional heat exchangers using single chamber headers having circular cross sections may experience joint failures or leaks where the heat exchange tubes are joined with the headers, e.g., due to the angle at which the tube intersects the header. To overcome such issues, these conventional headers often require bending of the heat exchanger tubes, the formation of oversized joints, excessive brazing of the joints, or result in other manufacturing challenges. Alternatively, a D-shaped header could be used, but this also results in a heavy, weight inefficient structure and excessive braze lengths.

According to the illustrated embodiment, header assembly 130 includes a dual-barrel configuration which rectifies many issues associated with single barrel headers. In this regard, first barrel 132 and second barrel 136 are stacked or positioned adjacent to each other along the radial direction R. Such a configuration provides several advantages to a conventional single chamber header. For example, for a given envelope and header assembly 130 size, a dual-barrel configuration can accommodate the same number or more heat exchange tubes 112 with less resulting stress and simplified manufacturing. More specifically, whereas a single barrel header requires sharp joints, excessive brazing, or tube bending procedures, first barrel 132 and second barrel 136 can be coupled to the same number of tubes (or more) with fewer manufacturing difficulties and stress concentrations. Therefore, the dual barrel configuration as shown in FIGS. 5 through 7 provides improved stress capabilities and thermal performance while reducing assembly times and costs.

Heat exchanger 108 may further include a septum 144 positioned between first barrel 132 and second barrel 136. In general, septum 144 extends along the axial direction A along an entire length of first barrel 132 and second barrel 136, at least partially defining and separating first manifold 134 and second manifold 138. As illustrated in FIG. 6, septum 144 also extends into inlet manifold 140 for splitting a flow of heated fluid from the heated fluid supply. In addition, septum 144 may be positioned and contoured to split, scoop, and/or direct the flow of heated fluid into first manifold 134 and second manifold 138 in the desired proportions.

More specifically, for example, an end 146 of septum 144 divides inlet manifold 140 into a first inlet 148 having a first flow area and being adjacent first manifold 134 and a second inlet 150 having a second flow area adjacent second manifold 138. Notably, inlet manifold 140 is curved and the flow of heated fluid may have a tendency to flow into second manifold 138 as a result. Thus, according to the exemplary embodiment, end 146 of septum 144 is offset from a midpoint of inlet manifold 140 along the radial direction R, e.g., such that the first flow area of first inlet 148 is different (e.g., greater) than the second flow area of second inlet 150. This may be desirable, for example, to compensate for the tendency of the momentum of the flow of heated fluid to cause a higher portion of the flow to travel into the second manifold 138.

In this manner, septum 144 generally divides the flow of heat exchange fluid passing to the first plurality of heat exchange tubes 112 and the second plurality of heat exchange tubes 112. However, according to the illustrated embodiment, septum 144 further defines one or more apertures 152 (see FIGS. 7 and 10) providing fluid communication between first manifold 134 and second manifold 138. Apertures 152 may be sized and positioned in any suitable manner for achieving the desired flow control and pressure distribution of the heat exchange fluid. In addition, although a single, flat septum 144 is illustrated herein, it should be appreciated that according to alternative embodiments, more than one septum 144 may be included having any suitable shape.

Header assembly 130 is described above only for explaining aspects of the present subject matter. It should be appreciated that modifications and variations may be made to header assembly 130 while remaining within the scope of the present subject matter. For example, according to another exemplary embodiment, header assembly 130 may include a third barrel stacked in the same manner as the first two barrels and extending along the axial direction A to define a third manifold in fluid communication with at least one of the plurality of heat exchange tubes. In addition, additional septums may be included, additional heat exchange tubes may be coupled to header assembly 130, and other variations may be implemented as well.

Referring now generally to FIGS. 8 through 15, another heat exchanger 160 is described according to an exemplary embodiment of the present subject matter. Heat exchanger 160 may be similar to heat exchanger 108 in many respects and may be used within heat exchanger assembly 100. According to the illustrated embodiment, heat exchanger 160 generally defines a lateral direction L, a vertical direction V, and a transverse direction T. Although a straight segment of heat exchanger 160 is illustrated in FIG. 8 according to such a coordinate system, it should be appreciated that according to an exemplary embodiment, heat exchanger is arcuate such that it may extend circumferentially within and fill bypass passageway 56 for improved thermal performance. In addition, it should be appreciated that the various features and configurations of heat exchangers 108 and 160 are interchangeable according to various exemplary embodiments. Due to similarity between the embodiments, similar reference numerals will be used to refer to like components.

Figure 10:
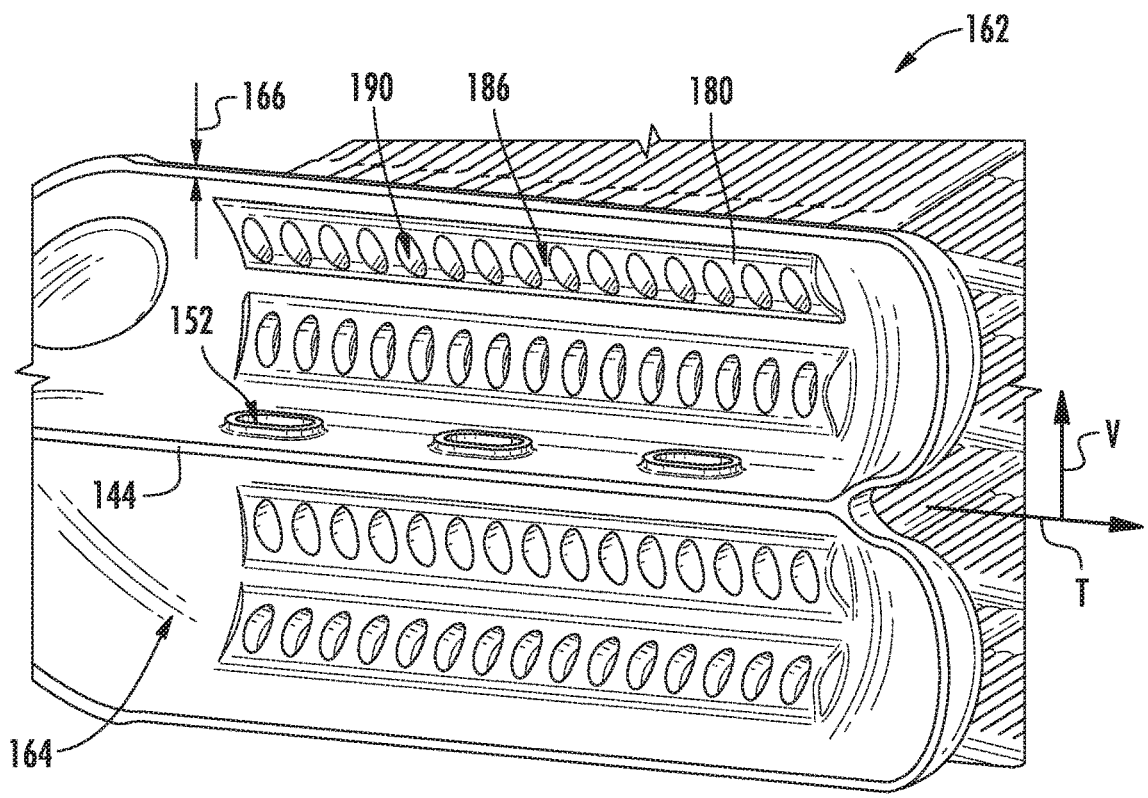
FIG. 10 is a perspective, cross sectional view of the exemplary header assembly of FIG. 9.
Figure 11:
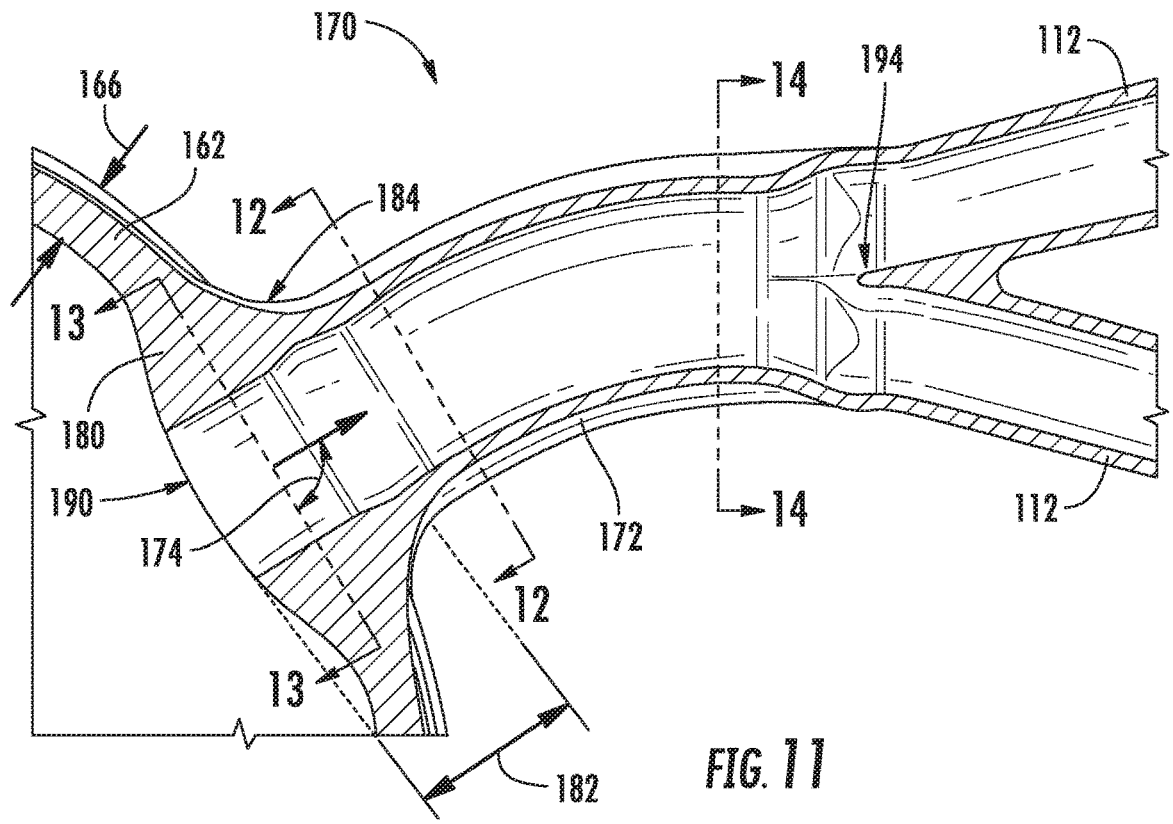
FIG. 11 is a cross sectional view of a transition portion of the exemplary heat exchanger assembly of FIG. 8 according to an exemplary embodiment of the present subject matter.
Figure 12:
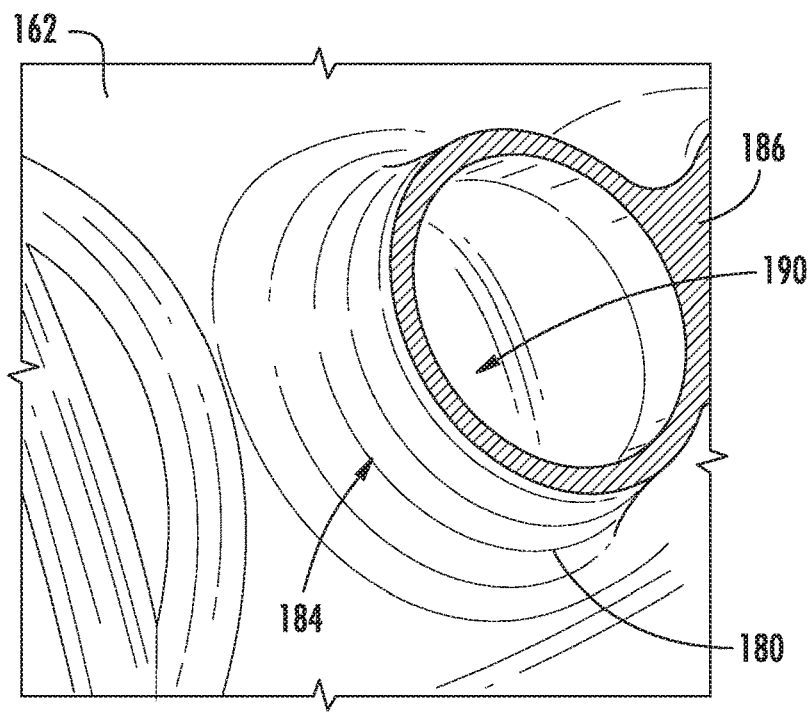
FIG. 12 is a cross sectional view of the exemplary transition portion of FIG. 11, taken along Line 12-12 of FIG. 11.

As illustrated in FIG. 8, heat exchanger core 110 includes a plurality of heat exchange tubes 112 positioned between two header assemblies, or headers 162. Header 162 extends along the transverse direction T and defines a header manifold 164. Similar to header assembly 130, header 162 may be a dual-barrel header having two manifolds split by a septum defining apertures for flow equalization. However, those details will be omitted here for brevity. As best shown in FIGS. 10 and 11, header 162 defines a header wall thickness 166 that is generally uniform except where header 162 interfaces with heat exchanger core 110, as described below.

Referring now generally to FIGS. 9 through 11, heat exchanger 160 includes a transition portion 170 that provides fluid communication between heat exchanger core 110 and header manifold 164. More specifically, transition portion 170 generally includes a transition tube 172 that extends between header 162 and heat exchanger core 110. For example, according to the illustrated embodiment, transition tube 172 extends from header 162 at an exit angle 174. According to the illustrated embodiment, exit angle 174 is 90 degrees or substantially normal to header 162. However, exit angle 174 may be other suitable angles according to alternative embodiments.

Heat exchanger 160 further includes a header junction 180 where transition tube 172 joins header 162. Header junction 180 is typically formed to minimize stresses at the location where transition tube 172 meets header 162 and reduce the flow restriction or drag on the flow of heat exchange fluid as it passes into transition tube 172. According to the illustrated embodiment, header junction 180 defines a junction thickness 182 that is an average thickness measured along a direction normal to header 162 proximate transition tube 172. For example, according to an exemplary embodiment, junction thickness 182 may be measured from inlet aperture 190 (described below) to a top of fillet 184 (also described below). Alternatively, junction thickness 182 may be measured along transition tube 172 from a bottom of header junction 180 to the beginning portion of fillet 184. According to exemplary embodiments, junction thickness 182 is greater than header wall thickness 166. As illustrated in FIG. 11, junction thickness 182 is approximately twice as large as header wall thickness 166.

In addition, header junction 180 may define a fillet 184 of any radius suitable for reducing joint stress concentrations and ensuring the rigidity of heat exchanger 160 within the limited space available on header 162. For example, fillet 184 may be defined between an outer surface of header 162 and transition tube 172 and may have a fillet radius to transition tube 172 diameter ratio (r/D) ranging between 0.15 and 0.5. For example, according to the illustrated embodiment, the fillet radius to transition tube diameter ratio (r/D) is approximately 0.35. As an example, one embodiment may include a fillet 184 having a radius of greater than 0.125 millimeters, greater than ten 0.25 millimeters, or greater than 1.25 millimeters.

Notably, heat exchanger 160 may include a plurality of transition tubes 172 positioned adjacent each other along the transverse direction T, e.g., to maximize the number of heat exchange tubes 112 and heat transfer capability of heat exchanger 160. However, stacking a plurality of circular transition tubes 172 immediately adjacent each other can result in stress concentrations and the potential for leaks at header junction 180. For example, a web 186 which is defined between adjacent transition tubes 172 becomes very small when circular transition tubes 172 are stacked in close proximity, resulting in structural deficiencies.

Figure 13:
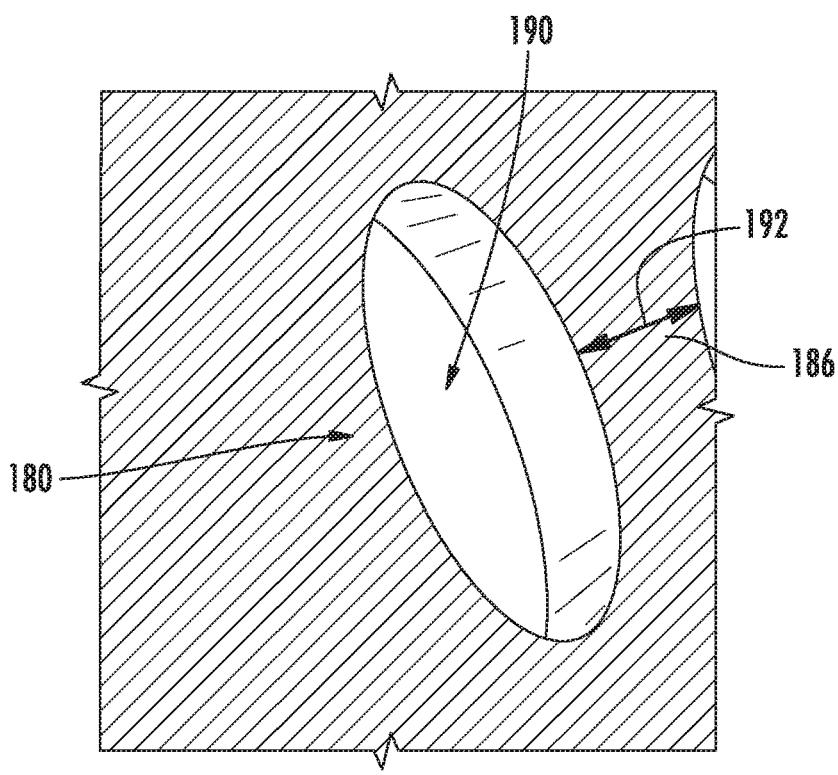
FIG. 13 is a cross sectional view of the exemplary transition portion of FIG. 11, taken along Line 13-13 of FIG. 11.
Figure 14:
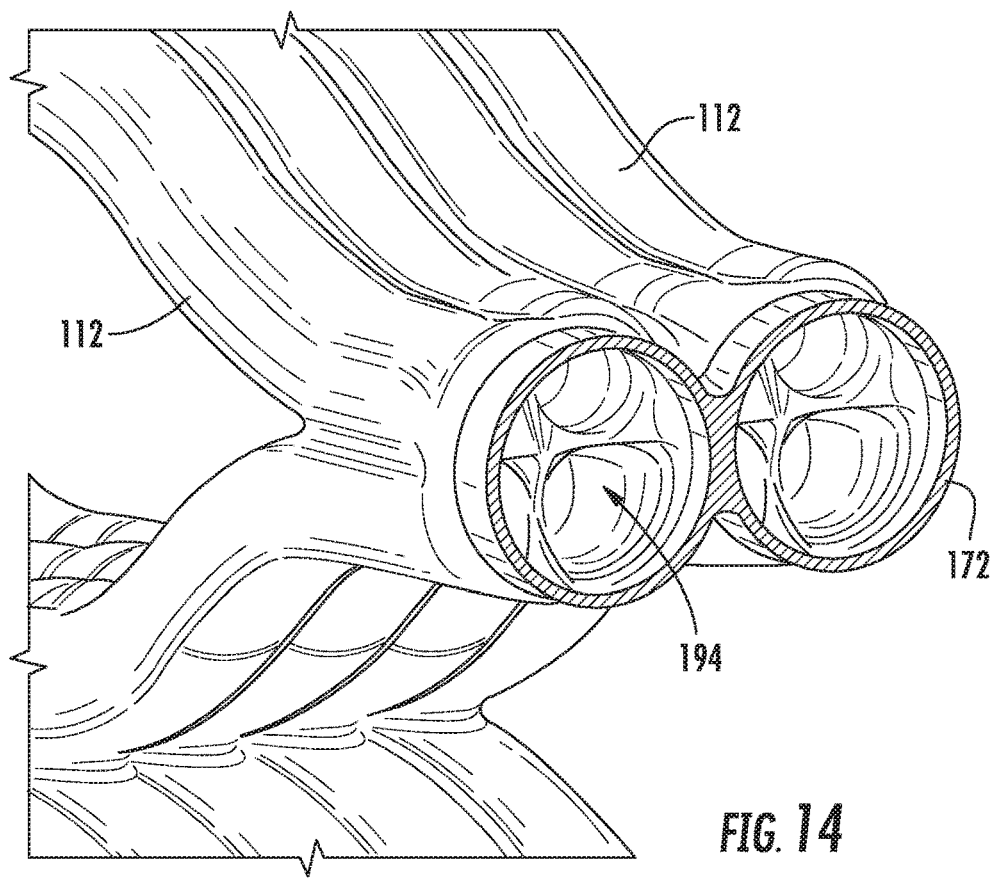
FIG. 14 is a cross sectional view of the exemplary transition portion of FIG. 11, taken along Line 14-14 of FIG. 11.
Figure 15:
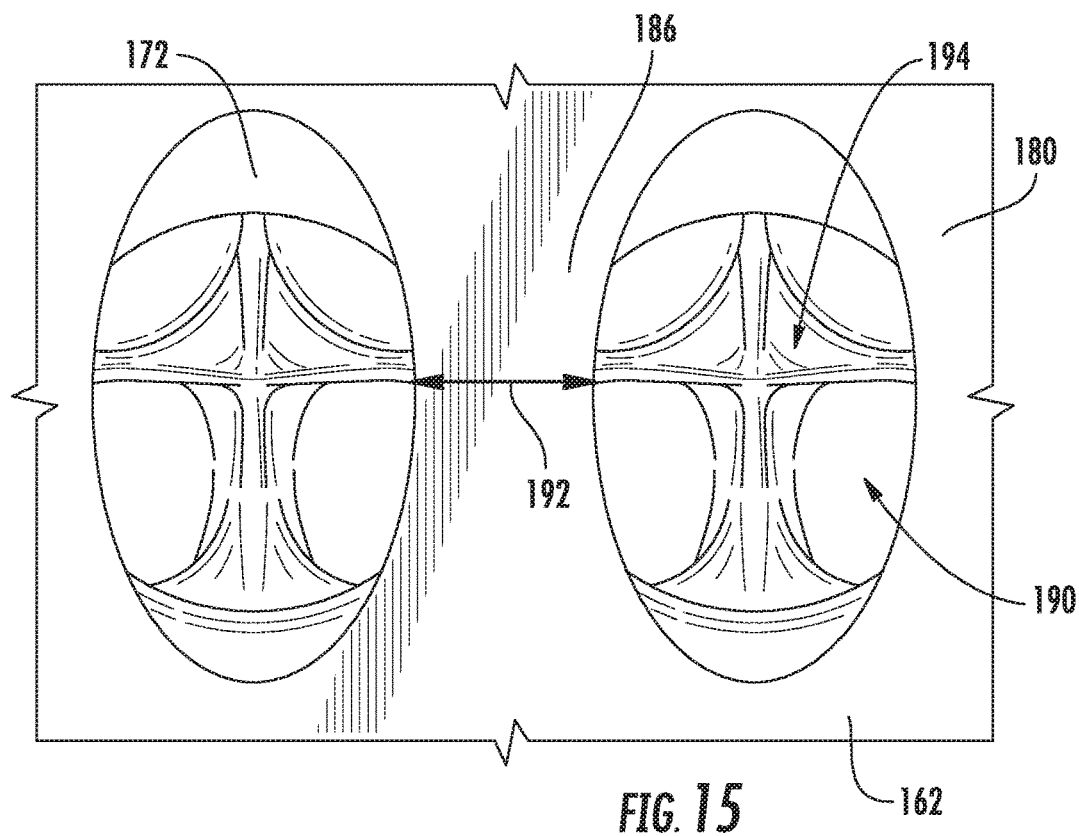
FIG. 15 is a front view of a header junction of the exemplary transition portion of FIG. 11 according to an exemplary embodiment of the present subject matter.

Therefore, using the additive manufacturing techniques described herein, header junction 180 defines a plurality of inlet apertures 190, each inlet aperture 190 having an elongated or non-circular cross section. For example, inlet apertures 190 define an elliptical cross section as shown in FIGS. 10, 13, and 15. Downstream of inlet aperture 190, header junction 180 slowly and smoothly transitions from an elliptical cross section to a circular cross section proximate transition tubes 172. In this manner, a web thickness 192 which is defined between adjacent transition tubes 172 along the transverse direction T is increased. For example, according to the illustrated embodiment, the ratio of web thickness 192 to transition tube 172 diameter (t/D) is approximately 0.4. This t/D ratio typically ranges between 0.15 and 0.6. According to one exemplary embodiment, the web thickness 192 is approximately 2 millimeters or larger. Notably, by defining an inlet aperture 190 having an elliptical cross section, more heat exchange tubes 112 can be stacked along the transverse direction T without causing stress concentrations.

According to exemplary embodiments, the elliptical cross section proximate inlet aperture 190 defines a first cross sectional area and the circular cross section of transition tube 172 defines a second cross sectional area. Notably, the first cross sectional area is substantially equivalent to the second cross sectional area. This enables a smooth flow transition between header manifold 164 and transition tube 172 while maximizing the number of heat exchange tubes 112 that can fit on a single header 162. Such a construction also ensures there is no overall flow rate restriction through header junction 180 or transition portion 170. Furthermore, if desired, the area at inlet aperture 190 can be increased by further elongating the elliptical cross-section to effectively nozzle the flow from header manifold 164 into transition tube 172.

Transition portion 170 of heat exchanger 160 may further include a splitting junction 194 where transition tube 172 splits into the plurality of heat exchange tubes 112. For example, according to the illustrated embodiment, transition tube 172 is divided into four heat exchange tubes 112 at splitting junction 194. Each heat exchange tube 112 may have a circular cross section, so circular transition tube 172 may split into four smaller, circular, heat exchange tubes 112. According to an exemplary embodiment, the total cross sectional area of the transition tube 172 is identical to the sum of the cross sectional areas of the heat exchanger tubes 112.

According to exemplary embodiments, heat exchanger 160 may include additional features for improving its thermal performance. For example, as illustrated in FIG. 8, heat exchanger 108 can include a heat shield 196 which is positioned adjacent heat exchange tubes 112 and extends along the transverse direction T. Heat shield 196 can be configured for urging the flow of bypass air through heat exchanger core 110 and protecting outer nacelle 50 from overheating. Furthermore, heat exchanger 160 can include a flow scoop (not shown) which is generally configured for capturing and guiding a portion of air through heat exchanger core 110 to improve heat transfer efficiency. Other features may be included according to alternative embodiments.

It should be appreciated that heat exchanger assembly 100 and headers 130, 162 are described herein only for the purpose of explaining aspects of the present subject matter. In this regard, headers 130 and 162 are used herein to describe exemplary configurations, constructions, and methods of manufacturing headers. It should be appreciated that the additive manufacturing techniques discussed herein may be used to manufacture other headers for use in any suitable heat exchanger, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of heat exchanger assembly 100 according to an exemplary embodiment of the present subject matter has been presented, an exemplary method 200 for manufacturing a header assembly and an exemplary method 300 of manufacturing a heat exchanger will be described. Method 200 can be used by a manufacturer to form headers 130 or 162, or any other suitable header assembly. Similarly, method 300 can be used by a manufacturer to form heat exchanger 108 or 160, or any other suitable heat exchanger. It should be appreciated that the exemplary methods 200, 300 are discussed herein only to describe exemplary aspects of the present subject matter, and are not intended to be limiting.

Figure 16:
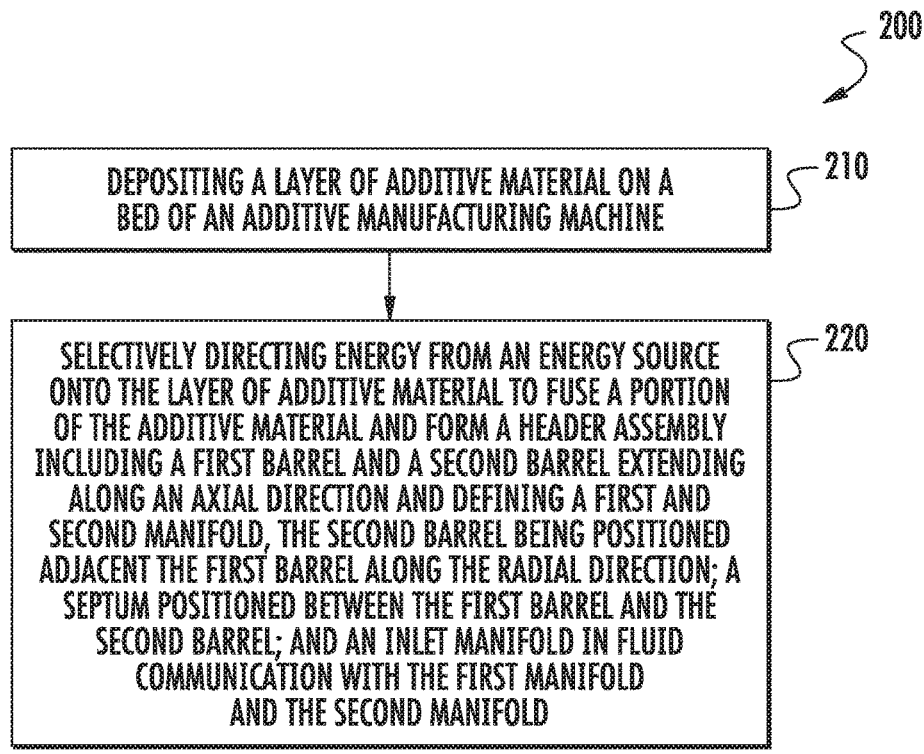
FIG. 16 is a method of manufacturing a header assembly according to an exemplary embodiment of the present subject matter.

Referring now to FIG. 16, method 200 includes, at step 210, depositing a layer of additive material on a bed of an additive manufacturing machine. Step 220 includes selectively directing energy from an energy source onto the layer of additive material to fuse a portion of the additive material and form a header assembly. According to an exemplary embodiment, the header assembly may be similar to header assembly 130 or header 162 as described above. For example, the header assembly may include a first barrel and a second barrel extending along a transverse direction and defining a first and second manifold, the second barrel being positioned adjacent the first barrel along the vertical direction. A septum may be positioned between the first barrel and the second barrel and an inlet manifold may be in fluid communication with the first manifold and the second manifold. Other configurations of the header assembly formed by method 200 are possible and within the scope of the present subject matter.

Figure 17:
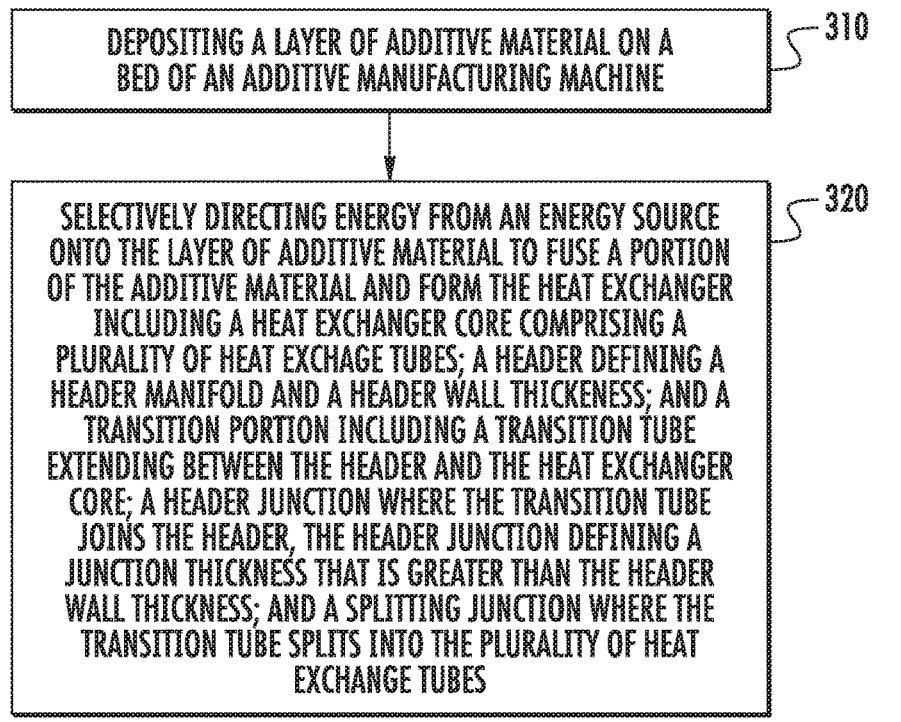
FIG. 17 is a method of manufacturing a heat exchanger according to an exemplary embodiment of the present subject matter.

Referring now to FIG. 17, method 300 includes, at step 310, depositing a layer of additive material on a bed of an additive manufacturing machine. Step 320 includes selectively directing energy from an energy source onto the layer of additive material to fuse a portion of the additive material and form a heat exchanger. According to an exemplary embodiment, the heat exchanger may be similar to heat exchanger 108 or 160 as described above. For example, the heat exchanger can include a heat exchanger core comprising a plurality of heat exchange tubes; a header defining a header manifold and a header wall thickness; and a transition portion. The transition portion may include a transition tube extending between the header and the heat exchanger core; a header junction where the transition tube joins the header, the header junction defining a junction thickness that is greater than the header wall thickness; and a splitting junction where the transition tube splits into the plurality of heat exchange tubes. Other configurations of the heat exchanger formed by method 300 are possible and within the scope of the present subject matter.

FIGS. 16 and 17 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of methods 200, 300 are explained using heat exchanger assembly 100 as an example, it should be appreciated that these methods may be applied to manufacture any suitable heat exchangers.

An additively manufactured heat exchanger and a method for manufacturing that heat exchanger and its components are described above. Notably, the heat exchanger and headers may generally include performance-enhancing geometries and improved tube/header interfaces that enhance the structural and thermal performance while improving reliability. The practical implementations of such features are facilitated by an additive manufacturing process, as described herein. These features may be introduced during the design of the heat exchangers and headers, such that they may be easily integrated into the design during the build process at little or no additional cost. Moreover, the entire heat exchanger, including the headers, the heat exchanger core, and other components can be formed integrally as a single monolithic component.

For example, as described above, according to an exemplary embodiment, first barrel 132, second barrel 136, septum 144, and inlet manifold 140 are integrally formed as a single monolithic component, e.g., using one or more additive manufacturing processes as described herein. In addition, according to exemplary embodiments, heat exchanger core 110, headers 130, 162, transition portions 170, and other components of heat exchanger assembly 100 are integrally formed as a single monolithic component using the additive manufacturing techniques described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat exchanger defining a vertical direction, a lateral direction, and a transverse direction, the heat exchanger comprising:
    a heat exchanger core comprising a plurality of heat exchange tubes;
    a header defining a circular cross section and extending along the transverse direction and defining a header manifold, the header defining a header wall thickness; and
    a transition portion providing fluid communication between the heat exchanger core and the header manifold, wherein the transition portion comprises:
        a transition tube extending between the header and the heat exchanger core; and
        a header junction where the transition tube joins the header, the header junction defining a protrusion extending at least partially into a volume defined by an inner wall of the header manifold to define a junction thickness that is greater than 1.5 times the header wall thickness wherein the header junction defines an inlet aperture, and wherein the protrusion surrounds the inlet aperture.

2. The heat exchanger of claim 1, wherein the header junction defines the inlet aperture and wherein the inlet aperture has a non-circular cross section and transitions into another circular cross section proximate the transition tube.

3. The heat exchanger of claim 2, wherein the non-circular cross section defines a first cross sectional area and the another circular cross section defines a second cross sectional area, the first cross sectional area being equivalent to the second cross sectional area.

4. The heat exchanger of claim 2, wherein the non-circular cross section of the inlet aperture is elongated or elliptical.

5. The heat exchanger of claim 1, the transition portion further comprising:
    a splitting junction where the transition tube splits into the plurality of heat exchange tubes.

6. The heat exchanger of claim 5, wherein the plurality of heat exchange tubes comprise four heat exchange tubes each defining a circular cross section.

7. The heat exchanger of claim 1, wherein the transition tube extends from the header at an exit angle, the exit angle being normal to a plane tangent to the header at the header junction.

8. The heat exchanger of claim 1, wherein the header junction defines a fillet between the header and the transition tube, the fillet defining a fillet radius to transition tube diameter ratio (r/D) of greater than 0.15.

9. The heat exchanger of claim 8, wherein the fillet radius to transition tube diameter ratio (r/D) is approximately 0.35.

10. The heat exchanger of claim 1, wherein the transition portion is one of a plurality of transition portions positioned adjacent each other along the transverse direction, each of the plurality of transition portions defining an inlet aperture that has an elliptical cross section, wherein a web thickness is defined between the inlet apertures of adjacent transition portions of the plurality of transition portions, a web thickness to transition tube diameter ratio being approximately 0.4.

11. The heat exchanger of claim 1, wherein the heat exchanger core, the header, and the transition portion are positioned within an annular bypass passageway defined between a core engine and an outer nacelle of a gas turbine engine.

12. The heat exchanger of claim 11, wherein the heat exchanger core is arcuate and extends circumferentially within the annular bypass passageway.

13. The heat exchanger of claim 1, wherein the plurality of heat exchange tubes are formed into a lattice structure and stacked along the transverse direction, the lattice structure being formed by the plurality of heat exchange tubes zig-zagging along a circumferential direction and moving inward and outward along a radial direction to form a plurality of joints with adjacent rows of the plurality of heat exchange tubes.

14. The heat exchanger of claim 1, wherein the heat exchanger core, the header, and the transition portion are integrally formed as a single monolithic component.

15. The heat exchanger of claim 1, wherein the heat exchanger comprises a plurality of layers formed by:
  depositing a layer of additive material on a bed of an additive manufacturing machine; and
  selectively directing energy from an energy source onto the layer of additive material to fuse a portion of the layer of additive material.

\* \* \* \* \*